(12) United States Patent
Choi

(10) Patent No.: US 11,643,034 B2
(45) Date of Patent: May 9, 2023

(54) VEHICLE POWER SUPPLY SYSTEM AND METHOD FOR OPERATING THE SAME

(71) Applicants: Hyundai Motor Company, Seoul (KR); Kia Corporation, Seoul (KR)

(72) Inventor: Sun Ho Choi, Hwaseong-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/505,306

(22) Filed: Oct. 19, 2021

(65) Prior Publication Data

US 2022/0355751 A1 Nov. 10, 2022

(30) Foreign Application Priority Data

May 10, 2021 (KR) .................. 10-2021-0060243

(51) Int. Cl.
| | | |
|---|---|---|
| B60W 10/26 | (2006.01) | |
| F02N 11/08 | (2006.01) | |
| B60R 16/033 | (2006.01) | |
| B60L 58/20 | (2019.01) | |
| B60W 10/06 | (2006.01) | |

(52) U.S. Cl.
CPC ............ *B60R 16/033* (2013.01); *B60L 58/20* (2019.02); *B60W 10/06* (2013.01); *B60W 10/26* (2013.01); *F02N 11/0818* (2013.01); *F02N 11/0866* (2013.01); *B60W 2510/244* (2013.01); *B60W 2710/244* (2013.01)

(58) Field of Classification Search
CPC ...... B60L 58/20; B60R 16/033; B60W 10/06; B60W 10/26; B60W 2510/244; B60W 2710/244; F02N 11/0814; F02N 11/0818; F02N 11/0822; F02N 11/0825; F02N 11/0862; F02N 11/0866; F02N 2200/06; F02N 2200/061; F02N 2200/062; F02N 2200/063; F02N 2200/064

See application file for complete search history.

(56) References Cited

U.S. PATENT DOCUMENTS

| | | | | |
|---|---|---|---|---|
| 2006/0097577 | A1* | 5/2006 | Kato ................ | H02J 7/1423 307/10.1 |
| 2011/0025127 | A1* | 2/2011 | Choi ................ | B60W 10/06 180/65.265 |
| 2011/0260544 | A1* | 10/2011 | Imai ................ | H02J 7/1423 307/66 |

(Continued)

*Primary Examiner* — Levi Gannon
(74) *Attorney, Agent, or Firm* — Morgan, Lewis & Bockius LLP

(57) ABSTRACT

A vehicle power supply system and a method for operating the same are provided. The vehicle power supply system includes a main battery and a sub-battery to supply power to an electronic load inside a vehicle, and a controller to control supplying of the power to the electronic load using at least one of the main battery or the sub-battery, by monitoring the main battery and the sub-battery. The controller determines whether the main battery allows entrance into Idle Stop and Go, determines whether the sub-battery is able to assist the ISG, and controls the sub-battery to assist the main battery to supply the power to the electronic load, when the main battery allows the entrance into the ISG, when the sub-battery is able to assist the ISG, and when entering into the ISG.

18 Claims, 6 Drawing Sheets

(56) References Cited

U.S. PATENT DOCUMENTS

| | | | |
|---|---|---|---|
| 2013/0175856 A1* | 7/2013 | Ojima | B60L 1/00 |
| | | | 307/9.1 |
| 2015/0239411 A1* | 8/2015 | Nakajima | F02N 11/108 |
| | | | 307/10.6 |
| 2015/0291039 A1* | 10/2015 | Sakata | B60L 50/10 |
| | | | 307/10.1 |
| 2016/0061906 A1* | 3/2016 | Cho | H02J 7/005 |
| | | | 324/434 |
| 2017/0106758 A1* | 4/2017 | Sakatani | B60R 16/03 |
| 2017/0136968 A1* | 5/2017 | Mukuno | H01M 10/425 |
| 2018/0202408 A1* | 7/2018 | Majima | F02N 11/0825 |
| 2018/0272968 A1* | 9/2018 | Yasunori | B60R 16/033 |
| 2019/0299973 A1* | 10/2019 | Morita | B60W 10/26 |

* cited by examiner

| DISCHARGE CURRENT UPPER LIMIT (DISCHARGING MODE) | BATTERY CELL TEMPERATURE(°C) | | | | |
|---|---|---|---|---|---|
| | -10 | 0 | 20 | 40 | 50 |
| SOC(%) 50 | 0 | 0 | 0 | 0 | 0 |
| SOC(%) 70 | 0 | 0.3C | 0.3C | 0.3C | 0 |
| SOC(%) 90 | 0 | 1C | 1C | 1C | 0 |
| SOC(%) 100 | 0.1C | 1C | 1C | 1C | 0.1C |

| CHARGE CURRENT UPPER LIMIT (CHARGING MODE) | BATTERY CELL TEMPERATURE(°C) | | | | |
|---|---|---|---|---|---|
| | -10 | 0 | 20 | 40 | 50 |
| SOC(%) 50 | 0.2C | 0.5C | 1C | 1C | 0 |
| SOC(%) 70 | 0.2C | 0.5C | 1C | 1C | 0 |
| SOC(%) 90 | 0.2C | 0.3C | 0.6C | 0.6C | 0 |
| SOC(%) 100 | 0 | 0 | 0 | 0 | 0 |

[C= BATTERY CAPACITY]

FIG.2

VEHICLE POWER SUPPLY SYSTEM AND METHOD FOR OPERATING THE SAME

CROSS-REFERENCE TO RELATED APPLICATION

The present application claims priority to Korean Patent Application No. 10-2021-0060243, filed on May 10, 2021, the entire contents of which is incorporated herein for all purposes by this reference.

BACKGROUND OF THE INVENTION

Field of the Invention

The present invention relates to a vehicle power supply system and a method for operating the same, capable of controlling the supply of power when performing Idle Stop and Go (ISG) of a vehicle.

Description of Related Art

An ISG system is to stop an internal combustion engine (e.g., an engine) when a vehicle is stopped, and to restart the internal combustion engine when the vehicle restarts. Accordingly, fuel consumption may be improved. However, a vehicle employing the ISG system fails to recover a battery discharge amount in an idle stop status, because charging efficiency is degraded due to the low electrolyte temperature in the winter and the progression of a battery life. Accordingly, since the battery maintains a lower state of charge (SoC) and a sulfation phenomenon is caused, the battery endurance is degraded, and the entrance into an ISG mode and a power generation mode is prohibited. Furthermore, the battery is discharged while the vehicle is parked, causing the fuel efficiency from being lowered.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a vehicle power supply system, configured for assisting the supply of power from a main battery by utilizing a sub-battery in an ISG situation of a vehicle, and a method for operating the same.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a vehicle power supply system includes a main battery and a sub-battery to supply power to an electronic load inside a vehicle, and a controller to monitor the main battery and the sub-battery and to control supplying of the power to the electronic load using at least one of the main battery or the sub-battery. The controller is configured to determine whether the main battery allows entrance into Idle Stop and Go, determines whether the sub-battery is configured to assist the ISG, and controls the sub-battery to assist the main battery to supply the power to the electronic load, when entering into the ISG, in a state that the main battery allows the entrance into the ISG and the sub-battery is configured to assist the ISG.

The controller is configured to determine whether the sub-battery is configured to assist the ISG, according to at least one of a failure status of the sub-battery, state of charge (SoC) value of the sub-battery, or a cell temperature of the sub-battery.

The controller sets a target voltage formed when entering into the ISG, to a voltage of the sub-battery, which is formed when entering into the ISG.

The controller regulates the target voltage, based on a discharge current of the sub-battery.

The controller is configured to control charging of the sub-battery, when not entering into the ISG, in the state that the main battery allows the entrance into the ISG, and the sub-battery is configured to assist the ISG.

The controller sets the target current, based on the status of the sub-battery, when not entering the ISG.

The controller regulates the target current, based on a charge voltage of the sub-battery.

The main battery is a lead-acid battery.

The sub-battery is mounted at an interior of the vehicle and is a lithium-ion battery.

The controller is configured to determine whether the main battery allows the entrance into the ISG, according to at least one of a failure status of the main battery or an SoC value of the main battery.

According to various aspects of the present invention, a method for operating a vehicle power system includes determining whether a main battery of the vehicle power supply system allows entrance into ISG, determining whether a sub-battery of the vehicle power supply system is configured to assist the ISG, when the main battery allows the entrance into the ISG, determining whether to enter into the ISG when the sub-battery is configured to assist the ISG, and controlling the sub-battery to assist the main battery to supply the power to an electronic load, when entering into the ISG.

The determining of whether the sub-battery is configured to assist the ISG includes: determining whether the sub-battery is normally operated, determining whether SoC value of the sub-battery exceeds preset reset SoC, and determining whether a cell temperature of the sub-battery is within a reference range.

The determining of whether the sub-battery includes determining that the sub-battery is configured to assist the ISG, when the sub-battery is normally operated, when the SoC value of the sub-battery exceeds the reference SoC, and when the cell temperature of the sub-battery is within the reference range.

The controlling of the sub-battery to assist the main battery to supply the power to the electronic load includes setting the target voltage when entering into the ISG, determining whether a discharge current of the sub-battery is less than a preset discharge current upper limit, determining whether the target voltage is equal to or less than a first reference voltage, when the discharge current is less than the preset discharge current upper limit, maintaining the target voltage, when the target voltage is equal to or less than the first reference voltage, and decreasing the target voltage, when the target voltage is not equal to or less than the first reference voltage.

The setting of the target voltage includes setting the target voltage to be equal to a voltage of the sub-battery when the entrance into the ISG is performed.

The controlling of the sub-battery to assist the main battery to supply the power to the electronic load includes determining whether the target voltage exceeds a second reference voltage, when a discharge current of the sub-battery is not less than a preset discharge current upper limit, maintaining the target voltage when the target voltage exceeds the second reference voltage, and increasing the target voltage, when the target voltage fails to exceed the second reference voltage.

The operating method further includes setting a target current of the sub-battery, according to a status of the sub-battery, when not entering into the ISG, in a status that the sub-battery is configured to assist the ISG, determining whether a charge voltage of the sub-battery exceeds a third reference voltage, and regulating the target current to be lower when the charge voltage exceeds the third reference voltage.

The operating method further includes determining whether the target current exceeds a preset charge current upper limit, when the charge voltage fails to exceed the third reference voltage, maintaining the target current when the target current exceeds the charge current upper limit, and regulating the target current to be higher, when the target current fails to exceed the preset charge current upper limit.

The determining of whether the main battery allows the entrance into the ISG includes determining whether the main battery allows the entrance into the ISG, based on at least one of a failure status or SoC value of the main battery.

The operating method further includes supplying the power to the electronic load by use of the main battery, when entering into the ISG, in the state that the sub-battery is not able to assist the ISG.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a view exemplarily illustrating a look-up table, according to exemplary embodiments of the present invention;

Figure 1:
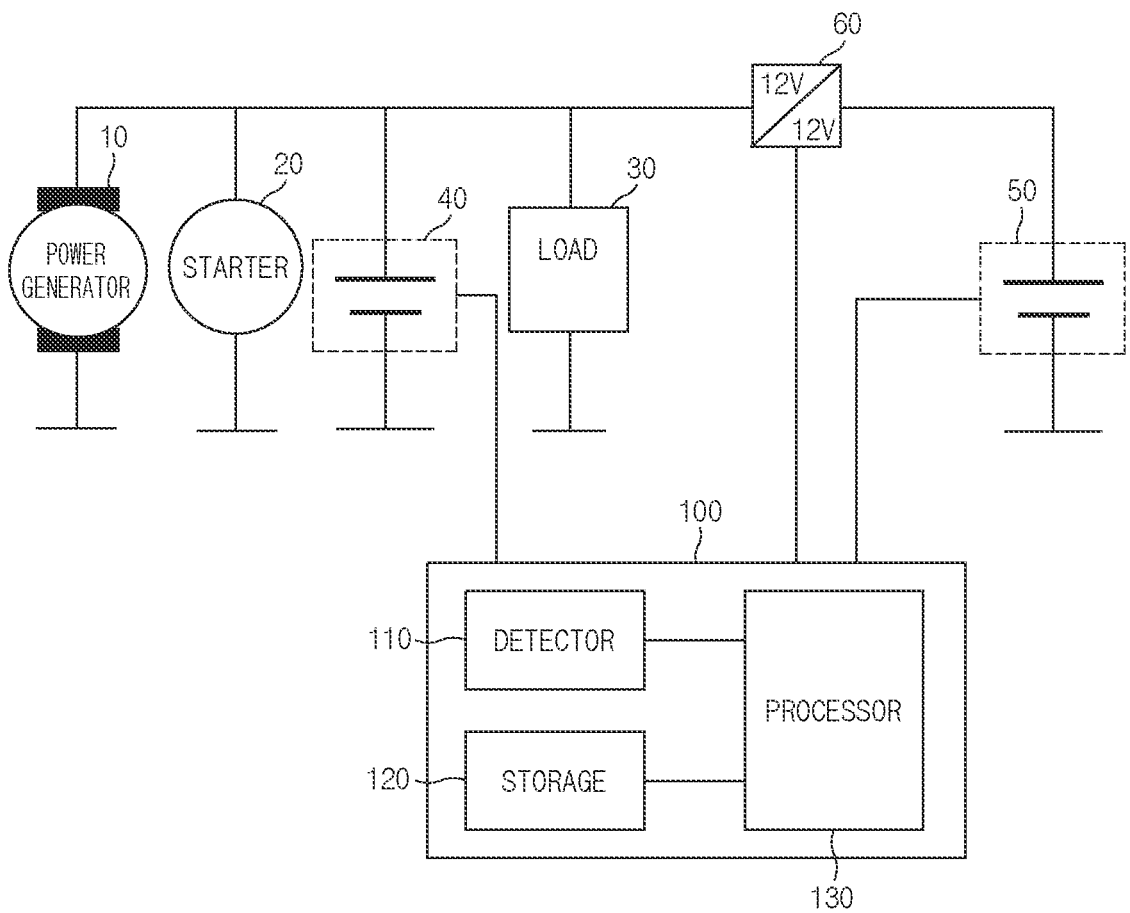
FIG. 1 is a view exemplarily illustrating the configuration of a vehicle power supply system, according to exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to accompanying drawings. In adding the reference numerals to the components of each drawing, it should be noted that the identical or equivalent component is designated by the identical numeral even when they are displayed on other drawings. Furthermore, in the following description of various exemplary embodiments of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", "(a)", "(b)", and the like may be used. These terms are merely intended to distinguish one component from another component, and the terms do not limit the nature, sequence or order of the constituent components. Furthermore, unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present invention suggests logic of supplying power, in which the supply of the power may be assisted by a sub-battery in the situation of an Idle Stop and Go (ISG) of a vehicle, as a 12 V dual power system is applied, to prevent a main battery from being discharged, endurance may be improved by reducing an accumulated current amount, the operating time for the ISG and the power generation may be increased to improve the fuel efficiency, and the variation (drop) in the voltage may be reduced when the restarting is performed due to the ISG.

FIG. 1 is a view exemplarily illustrating the configuration of a vehicle power supply system, according to exemplary embodiments of the present invention, and FIG. 2 is a view exemplarily illustrating a look-up table, according to exemplary embodiments of the present invention.

The vehicle power supply system may include a power generator 10, a starter 20, a load 30, a main battery 40, a sub-battery 50, a power converter 60 and/or a controller 100.

The power generator 10, which is a device to generate electricity in a vehicle, may be referred to as an alternator.

The power generator 10 may convert power (dynamic energy) generated from an internal combustion engine (e.g., an engine) into electrical energy. The power generator 10 may supply, to the load 30, electrical energy (electricity) generated while an engine is running. Furthermore, the power generator 10 may supply charging power to the main battery 40 and/the sub-battery 50 while the vehicle is traveling by running the engine.

The starter 20 starts an internal combustion engine (e.g., an engine). The starter 20 may restart the internal combustion engine through an ISG function. In other words, the starter 20 may start the engine when idle stop is released.

The load 30 may be an electrical device (an electrical component or electrical part) mounted in the vehicle and operated through the electrical energy. The load 30 may receive electrical energy (driving power) required for operation from the power generator 10, the main battery 40 and/or the sub-battery 50. For example, the load 30 may include a headlamp, a tail lamp, a turn signal lamp, a radio, an air conditioner, an internal lamp, a heated wire, a wiper, black box, a navigation terminal, an Anti-lock Brake System (ABS), and/or an Electric Power Steering (EPS)

The main battery 40 may be mounted in an engine compartment of the vehicle or a trunk of the vehicle. The main battery 40 may supply power to the starter 20 and/or the load 30. The main battery 40 may supply power to the load 30 when the entrance into an idle stop mode is performed through the ISG function. Furthermore, the main battery 40 may supply power to the starter 20 when the restarting is performed through the ISG function.

The sub-battery 50 may be mounted in the interior of the vehicle and may supply power to the load 30. The sub-battery 50 may supply the power to the load 30 by assisting the main battery 40 when the entrance into the idle stop mode is performed through the ISG function. The sub-battery 50 may be charged with the electrical energy generated from the power generator 10, when the restarting is performed through the ISG function.

The main battery 40 and the sub-battery 50 may supply power of a specific voltage (e.g., 12 V) to the load 30. The main battery 40 may be implemented with a lead-acid battery, and the sub-battery 50 may be implemented with a lithium-ion battery.

The power converter 60 may receive the electrical energy generated from the power generator 10 and may convert the electrical energy into DC power of a specific voltage (e.g., 12 V). The power converter 60 may charge the sub-battery 50 with the converted DC power by supplying the converted DC power to the sub-battery 50. The power converter 60 may supply the power, which is output from the sub-battery 50, to the load 30 by converting the power from the sub-battery 50 into driving power (e.g., the voltage of 12 V). The power converter 60 may be a converter.

The controller 100 may monitor the main battery 40 and the sub-battery 50. The controller 100 may control the supply of power by use of the main battery 40 and the sub-battery 50, based on monitoring results of the main battery 40 and the sub-battery 50, when entering into the ISG, that is, in the situation of the idle stop. The controller 100 may control charging or discharging of the sub-battery 50 by controlling a target voltage and/or a target current of the power converter 60. The controller 100 may include a detector 110, a storage 120, and a processor 130.

The detector 110 may detect battery status information by use of a current sensor, a voltage sensor, and a temperature sensor mounted in each of the main battery 40 and the sub-battery 50. In other words, the detector 110 may measure a voltage, a current, and a cell temperature of the main battery 40 and the sub-battery 50. The detector 110 may transmit, to the processor 130, the detected battery status information. According to the exemplary embodiment of the present invention, although the detector 110 has been described in that the detector 110 acquires the battery status information by use of the sensors mounted in the vehicle by way of example, the present invention is not limited. The detector 110 may make communication with a battery management system (BMS) to receive the battery status information from the BMS.

The storage 120 may store a look-up table having a discharge current upper limit defined based on a battery SoC and a battery cell temperature, and a look-up table having a charge upper limit defined based on the battery SoC, and the battery cell temperature. The look-up table may be generated in a form of a table as illustrated in FIG. 2. The storage 120 may be a non-transitory storage medium which stores instructions executed by the processor 130. The storage 130 may be implemented with at least one of storage media (recording media) such as a flash memory, a hard disk, a Security Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), or a register.

The processor 130 may control the overall operation of the controller 100. The processor 130 may be implemented with at least one of processing units of an Application Specific Integrated Circuit (ASIC), a Digital Signal Processor (DSP), Programmable Logic Devices (PLDs), Field Programmable Gate Arrays (FPGAs), a Central Processing unit (CPU), microcontrollers, or microprocessors.

The processor 130 may monitor battery statuses of the main battery 40 and the sub-battery 50 while the vehicle is traveling. The processor 130 may determine whether the main battery 40 satisfies a condition for entering into the ISG, based on the status information of the main battery 40, when the engine is running. In other words, the processor 130 may determine whether the main battery 40 is able to enter into the ISG, by considering the SoC value of the main battery 40 and/or the failure status of the main battery 40. For example, the processor 130 may determine that the main battery 40 is able to enter into the ISG, when the SoC value of the main battery 40 allows restarting after entrance into the ISG, that is, the idle stop mode, and may determine that the main battery 40 is unable to enter into the ISG, when the SoC value of the main battery 40 does not allow the restarting after the entrance into the ISG.

The processor 130 may activate (execute) the ISG function when the main battery 40 is able to enter into the ISG. The processor 130 may prohibit the ISG when the main battery 40 is failed to enter into the ISG. In other words, the processor 130 may deactivate the ISG function, when the main battery 40 fails to satisfy the condition for entering into ISG.

The processor 130 may determine whether the sub-battery 50 satisfies a condition (ISG assisting condition) for assisting the ISG function, in the state that the ISG function is activated. The processor 130 may determine whether the sub-battery 50 is able to assist the ISG function, by considering the failure status, the SoC, and the cell temperature of the sub-battery 50. Furthermore, the processor 130 may determine the failure status of the power converter 60, when determining whether the sub-battery 50 is able to assist the ISG.

In other words, the processor 130 may determine whether the sub-battery 50 is abnormal, that is, failed. Furthermore, the processor 130 may determine whether the power converter 60 is abnormal. Furthermore, the processor 130 may determine whether a state of charge (SoC) value of the sub-battery 50 exceeds a reference value (reference SoC). Furthermore, the processor 130 may determine whether the cell temperature of the sub-battery 50 is within a reference range.

The processor 130 may determine the sub-battery 50 as being able to assist the ISG, when the sub-battery 50 and the power converter 60 are normally operated, when the SoC value of the sub-battery 50 exceeds the reference value, and when the cell temperature of the sub-battery 50 is within the reference range. The processor 130 may perform the ISG function by use of the main battery 40, when the sub-battery 50 and/or the power converter 60 are failed, when the SoC value of the sub-battery 50 is equal to or less than the reference value, and when the cell temperature of the sub-battery 50 deviates from the reference range. In other words, when entering into the idle stop mode, the processor 130 may supply power to the load 30 using the main battery 40, and when the idle stop mode is released, that is, when restarting is performed, the processor 130 may supply the power to the starter 20 using the main battery 40.

The processor 130 may determine whether to enter into the ISG, when the sub-battery 50 is able to assist the ISG. The processor 130 may determine a mode of controlling the sub-battery 50, depending on whether to enter into the ISG. The mode of controlling the sub-battery 50 may be classified into a discharging mode and a charging mode. The processor 130 may enter into the discharging mode for the sub-battery 50, when entering into the ISG. When entering into the discharging mode for the sub-battery 50, the processor 130 may set a target voltage to an output voltage of the sub-battery 50 when entering into the ISG. The processor 130 may determine whether a discharge current of the sub-battery 50 is less than a preset discharge upper limit (a discharge current upper limit). The processor 130 may set the discharge upper limit by making reference to the look-up table stored in the storage 120. The processor 130 may determine whether the target voltage is less than or equal to a first reference voltage, when the discharge current of the sub-battery 50 is less than the preset discharge upper limit. The processor 130 may maintain the target voltage when the target voltage is equal to or less than the first reference voltage. The processor 130 may regulate the target voltage to be lower when the target voltage is not equal to or less than the first reference voltage. The processor 130 may determine whether the target voltage exceeds a second reference voltage, when the discharge current of the sub-battery 50 is equal to or greater than the preset discharge upper limit. The processor 130 may maintain the target voltage when the target voltage exceeds the second reference voltage. The processor 130 may regulate the target voltage to be higher, when the target voltage does not exceed the second reference voltage. In the instant case, the first reference voltage and the second reference voltage may be previously defined by a system designer.

Furthermore, the processor 130 may enter into the charging mode for the sub-battery 50 when does not enter into the ISG. When entering into the charging mode for the sub-battery 50, the processor 130 may set a target current depending on the status (the SoC and the cell temperature) of the sub-battery 50, by making reference to the look-up table stored in the storage 120.

The processor 130 may determine whether a charge voltage of the sub-battery 50 exceeds a third reference voltage, after setting the target current. The third reference voltage may be previously set by the system designer. The processor 130 may regulate the target current to be lower when the charge voltage of the sub-battery 50 exceeds the third reference voltage. The processor 130 may determine whether the target current exceeds a charge upper limit (charge upper limit), when the charge voltage of the sub-battery 50 does not exceed the third reference voltage. The charge upper limit may be determined by considering the performance of the battery. The processor 130 may maintain the target current when the target current exceeds the charge upper limit. The processor 130 may regulate the target current to be higher when the target current does not exceed the charge upper limit.

Figure 3:
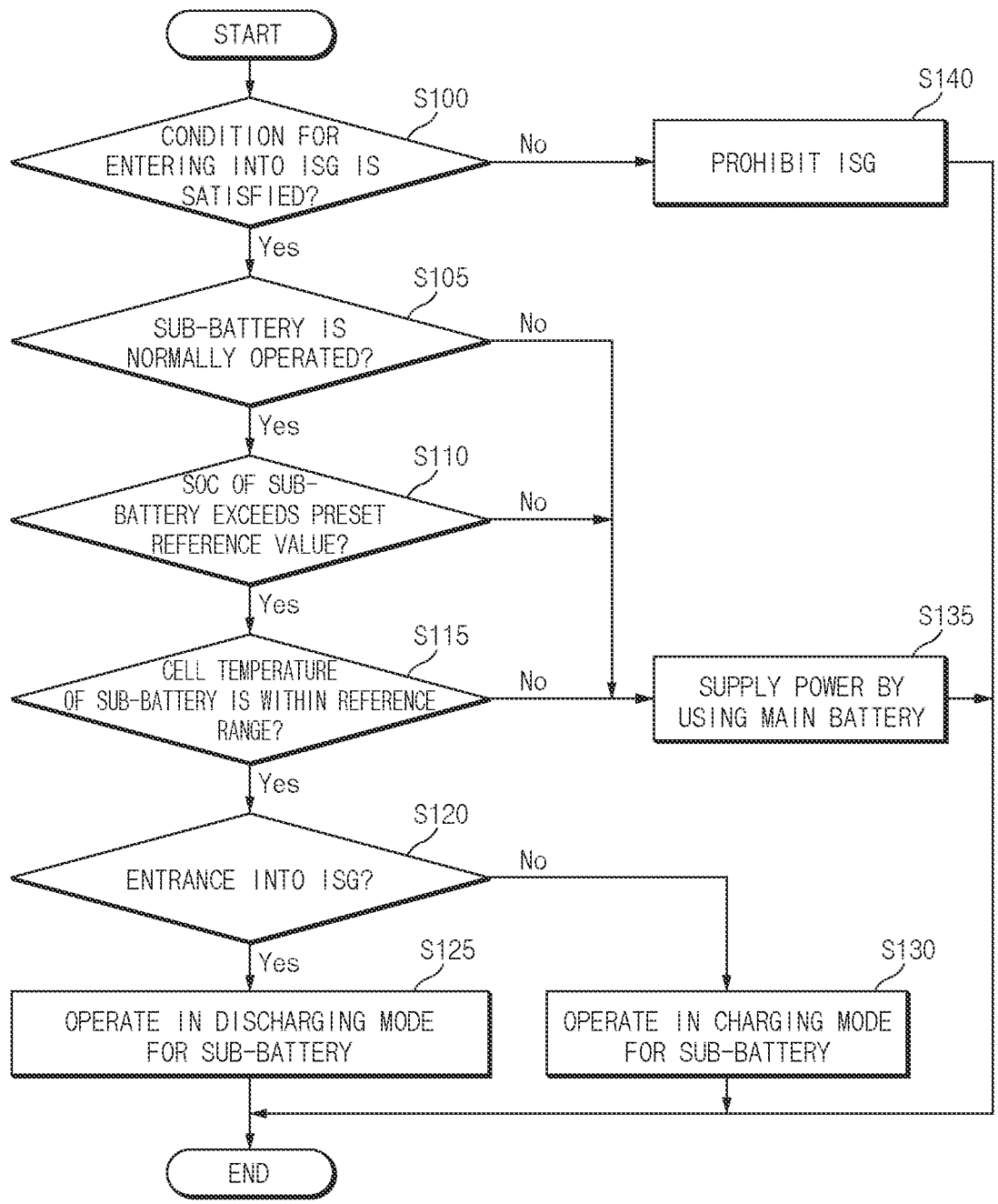
FIG. 3 is a view exemplarily illustrating the configuration of a vehicle power supply system, according to exemplary embodiments of the present invention.

FIG. 3 is a view exemplarily illustrating a method for operating a vehicle power supply system, according to exemplary embodiments of the present invention.

The controller 100 may determine whether the main battery 40 satisfies the condition for entering into the ISG (S100). The controller 100 may determine whether the SoC value of the main battery 40 allows the restarting after the entrance into the ISG, while the engine is running. The controller 100 may determine that the main battery 40 allows the entrance into the ISG, when the SoC value of the main battery 40 allows the restarting after the entrance into the ISG.

The controller 100 may determine whether the sub-battery 50 is normally operated, when the main battery 40 satisfies the condition for entering into the ISG (S105). The controller 100 may determine whether the sub-battery 50 is normally operated, by considering the failure status of the power converter 60, other than the failure status of the sub-battery 50. In other words, the controller 100 may determine the sub-battery 50 as being in a normal status, while the sub-battery 50 and the power converter 60 are normally operated.

The controller 100 may determine whether the SoC value of the sub-battery 50 exceeds a predetermined reference value (a reference SoC) when the sub-battery 50 is in the normal status (S110). When the SoC value of the sub-battery 50 is lowered to be the reference value or less, and when entering into the ISG, assisting of the supply of the power by utilizing the sub-battery 50 is difficult. Accordingly, the SoC value of the sub-battery 50 is determined.

The controller 100 may determine whether the cell temperature of the sub-battery 50 is within the reference range, when the SoC value of the sub-battery 50 exceeds the reference value (S115). The controller 100 may determine whether the cell temperature of the sub-battery 50 is in the range of a temperature lower limit and a temperature upper limit. The controller 100 may determine that the sub-battery 50 is able to assist the ISG, when the cell temperature is in the reference range. The processor 130 may determine the sub-battery 100 as being able to assist the ISG, while the sub-battery 50 is normally operated, when the SoC value of the sub-battery 50 exceeds the reference value, and when the cell temperature of the sub-battery 50 is within the reference range.

The controller 100 may determine whether to enter into the ISG, when the sub-battery 50 is able to assist the ISG (S120). The controller 100 may determine the entrance into the ISG through the ISG controller. The ISG controller may be configured to determine the entrance into the ISG (the entrance into the idle stop mode), when detecting that the vehicle is stopped, and may restart when detecting that a driver releases the depressing of the brake pedal. In the instant case, the ISG control device may detect a vehicle stopped through a Global Positioning System (GPS) receiver, a navigation terminal, and/or a speedometer.

The controller 100 may operate in the discharging mode for the sub-battery 50 when entering into the ISG (S125). The controller 100 may switch the control mode for the sub-battery 50 to the discharging mode, when entering into the idle stop mode, in the status that the supply of the power is possible by use of the sub-battery 50. The controller 100 may supply power to the load 30 by assisting the main battery 40, because of controlling the discharge of the sub-battery 50 in the discharging mode. In other words, the main battery 40 and the sub-battery 50 may supply power to the load 30 in the discharging mode for the sub-battery 50.

The controller 100 may operate in the charging mode for the sub-battery 50 when not entering into the ISG (S130). The controller 100 may charge the sub-battery 50 with electrical energy generated from the power generator 10 by changing the control mode of the sub-battery 50 to the charging mode, when not entering into the idle stop mode.

Meanwhile, the controller 100 may supply power by use of the main battery 40 (S135) when the sub-battery 50 is not operated normally in S105, when the SoC value of the sub-battery 50 does not exceed the reference value in S110, or when the cell temperature of the sub-battery 50 is out of the reference range in S115. In other words, the controller 100 may perform the ISG control operation by utilizing the main battery 40, when the sub-battery 50 is not able to assist the ISG. The controller 100 may supply, to the load 30, power output from the main battery 40, when the vehicle is stopped and enters into the idle stop mode.

When the main battery 40 fails to satisfy the condition for entering into the ISG in S100, the controller 100 may prohibit the ISG (S140). For example, the controller 100 may deactivate the ISG function, when the SoC value of the main battery 40 does not allow the restarting after the entrance into the ISG (after the entrance into the idle stop mode).

Figure 4:
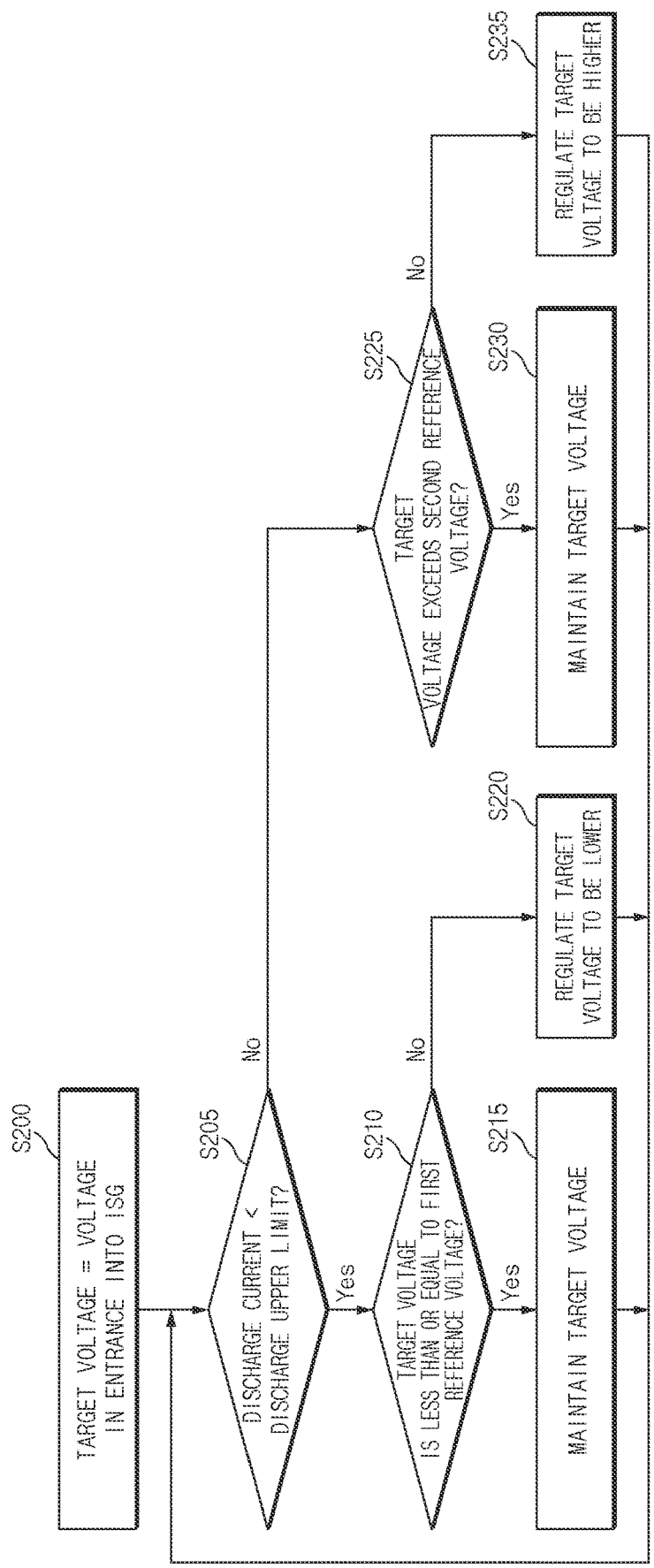
FIG. 4 is a flowchart illustrating a method for controlling a sub-battery, according to various exemplary embodiments of the present invention.

FIG. 4 is a flowchart illustrating a method for controlling a sub-battery, according to various exemplary embodiments of the present invention.

The controller 100 may set the target voltage to a voltage in the entrance into the ISG, when entering into the discharging mode (S200). The controller 100 may enter into the discharging mode, when determining the entrance into the ISG, while the sub-battery 50 is able to assist the ISG. The controller 100 may set the target voltage to the target voltage of the power converter 60 to be equal to the voltage of the sub-battery 50 in the entrance into the ISG such that the voltage of the sub-battery 50 is maintained before and after the entrance into the ISG.

Thereafter, the controller 100 may determine whether the discharge current of the sub-battery 50 is less than the discharge upper limit (discharge current upper limit) (S205). The discharge upper limit may be determined by making reference to the look-up table stored in the storage 120, based on the SoC and/or the cell temperature of the sub-battery 50.

The controller 100 may determine whether the target voltage is less than or equal to the first reference voltage, when the discharge current of the sub-battery is less than the preset discharge upper limit (S210).

The processor 100 may maintain the target voltage when the target voltage is equal to or less than the first reference voltage (S215).

The processor 100 may regulate the target voltage to be lower when the target voltage is equal to or less than the first reference voltage (S220).

When the discharge current is not less than the discharge upper limit in S205, the controller 100 may determine whether the target voltage exceeds the second reference voltage (S225). The first reference voltage and the second reference voltage may be determined based on the discharge current The controller 100 may maintain the target voltage when the target voltage exceeds the second reference voltage (S230).

The controller 100 may regulate the target voltage to be higher when the target voltage does not exceed the second reference voltage (S235).

Figure 5:
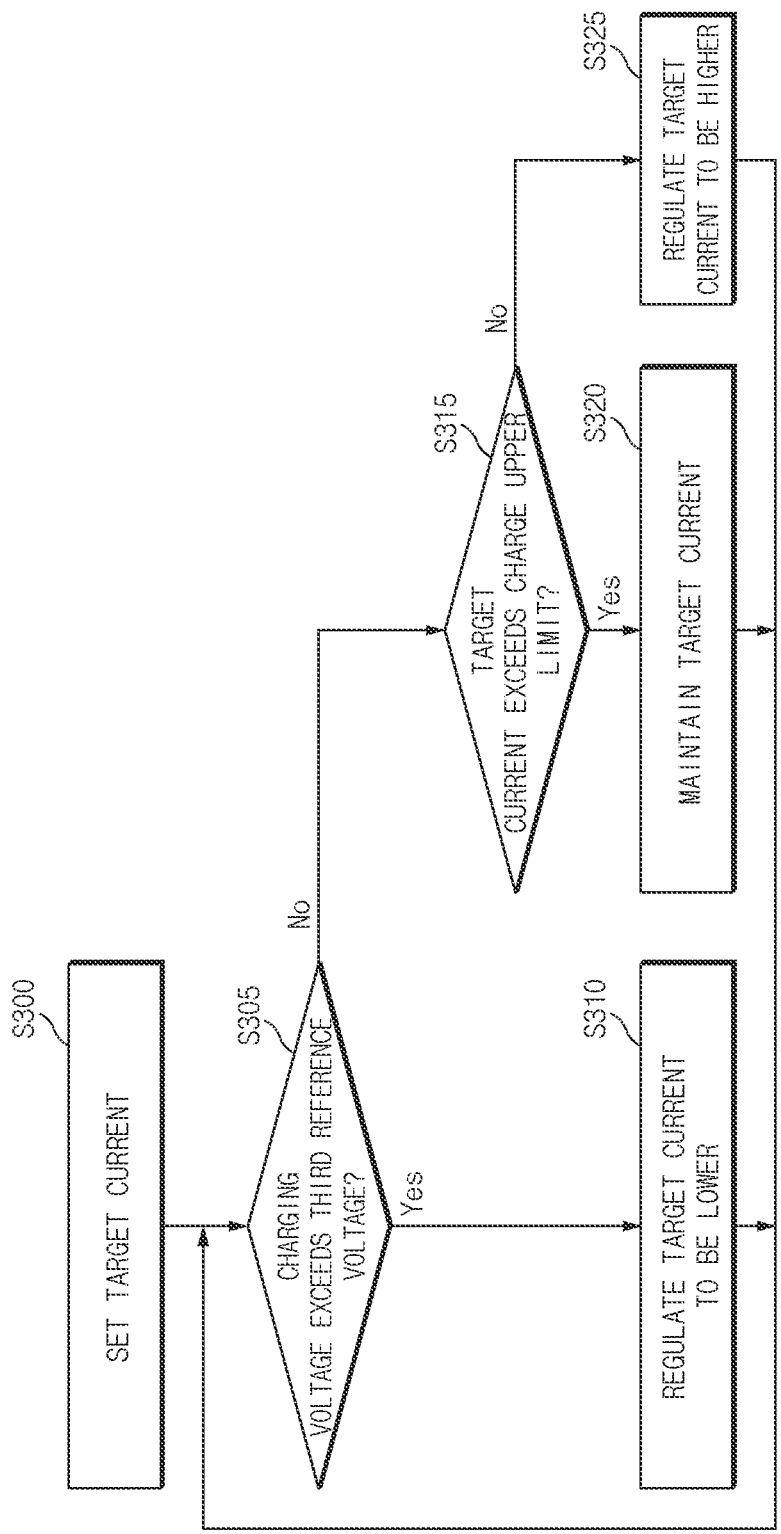
FIG. 5 is a flowchart illustrating a method for controlling a sub-battery, according to various exemplary embodiments of the present invention.

FIG. 5 is a flowchart illustrating a method for controlling a sub-battery, according to various exemplary embodiments of the present invention.

The controller 100 may set the target current of the power converter 60 based on the status (that is, the SoC and/or the cell temperature) of the sub-battery 50, when entering into the charging mode (S300). The controller 100 may enter into the charging mode, when determining not to enter into the ISG, when the sub-battery 50 is able to assist the ISG.

The controller 100 may determine whether the charge voltage exceeds a third reference voltage (S305). The third reference voltage may be determined based on the set target current.

The controller 100 may regulate the target current to be lower, when the charge voltage exceeds the third reference voltage (S310).

The controller 100 may determine whether the target current exceeds the charge upper limit (the charge current upper limit), when the charge voltage of the sub-battery 50 does not exceed the third reference voltage (S315).

The processor 100 may maintain the target current when the target current exceeds the charge upper limit (S320).

The controller 100 may regulate the target current to be higher when the target current does not exceed the charge upper limit (S325).

Figure 6:
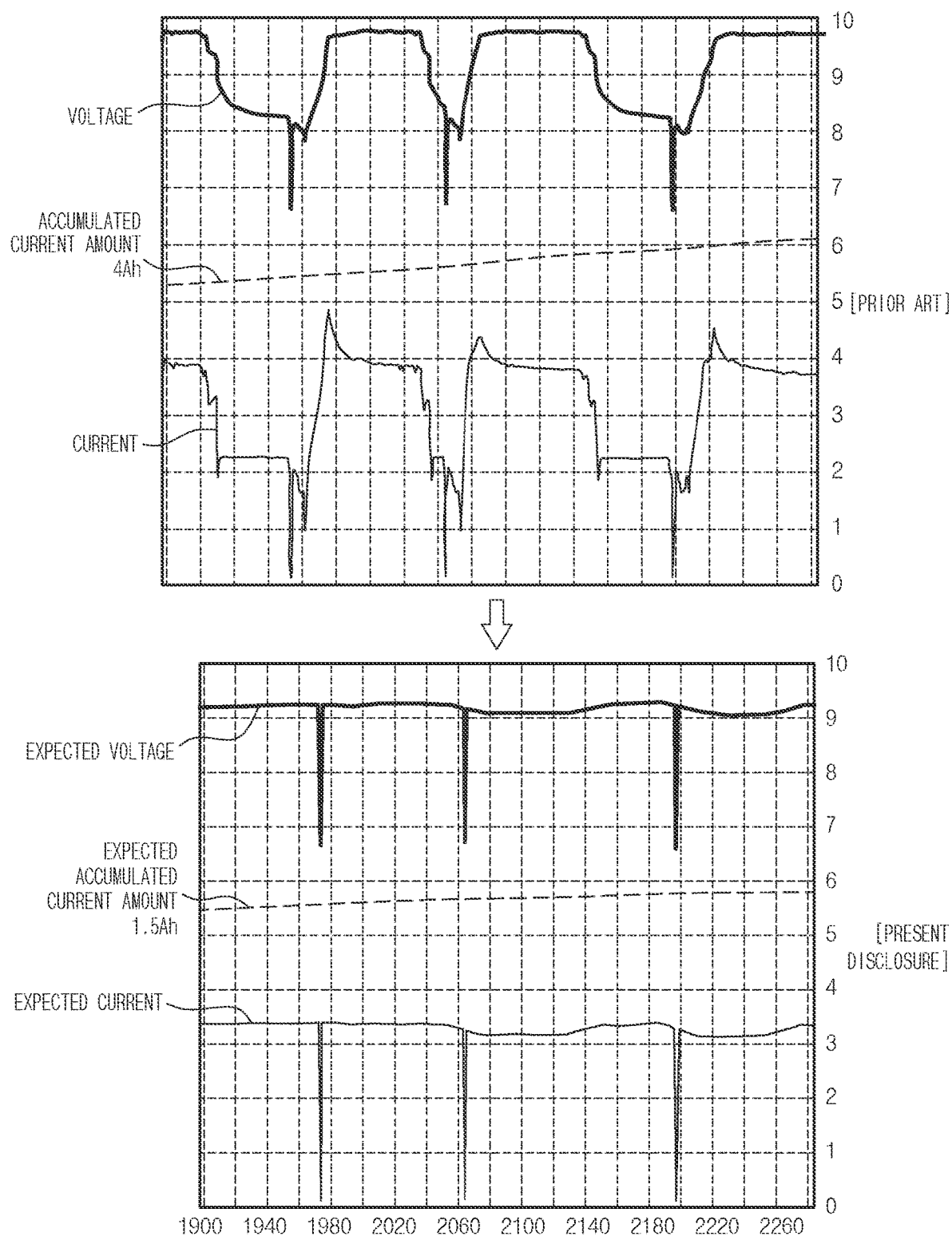
FIG. 6 is a graph illustrating the variation in voltage and current of a main battery, according to exemplary embodiments of the present invention.

FIG. 6 is a graph illustrating the variation in voltage and current of a main battery, according to exemplary embodiments of the present invention.

Referring to FIG. 6, when the ISG function is performed by use of only the main battery 40 according to a related art, the variation in the voltage and the current of the main battery 40 may be increased, and an accumulated current amount may be increased. Meanwhile, according to various exemplary embodiments of the present invention, a dual power system may be implemented by use of the main battery 40 and the sub-battery 50, and the assisting in the supply of power may be supported by use of the sub-battery 50 in the idle stop status. In the instant case, the variation in the voltage and the current of the main battery 40 may be decreased, stabilizing power and reducing the variation in the voltage when restarting is performed through the ISG. Furthermore, as the accumulated current amount is decreased, the endurance of the main battery 40 may be improved and the operating time for the ISG and the control of the power generation may be increased, improving the fuel efficiency.

According to various exemplary embodiments of the present invention, since the supply of the power from the main battery may be assisted by utilizing the sub-battery in the ISG situation of the vehicle, the main battery may be prevented from being discharged, the endurance of the main battery may be improved, and the fuel efficiency may be improved by increasing an operating time for the ISG and power generation control.

Furthermore, according to various exemplary embodiments of the present invention, the variation in the voltage supplied to the electrical components may be reduced when restarting is performed through the ISG, improving the productivity (e.g., the variation in the brightness of an internal light) of the electronic components.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle power supply system comprising:
   a main battery and a sub-battery configured to supply power to an electronic load inside a vehicle; and
   a controller configured to:
      monitor the main battery and the sub-battery; and
      control supplying of the power to the electronic load using at least one of the main battery or the sub-battery,
      determine whether the main battery allows entrance into Idle Stop and Go (ISG) of the vehicle;
      determine whether the sub-battery is able to assist the ISG; and
      control the sub-battery to assist the main battery to supply the power to the electronic load, when entering into the ISG, in a state that the controller concludes that the main battery allows the entrance into the ISG and the sub-battery is able to assist the ISG,
      wherein the controller is configured to set a target voltage of the vehicle power supply system formed when entering into the ISG, to a voltage of the sub-battery, which is formed when entering into the ISG.

2. The vehicle power supply system of claim 1, wherein the controller is configured to determine whether the sub-battery is able to assist the ISG, according to at least one of a failure status of the sub-battery, state of charge (SoC) value of the sub-battery, or a cell temperature of the sub-battery.

3. The vehicle power supply system of claim 1, wherein the controller is configured to regulate the target voltage, based on a discharge current of the sub-battery.

4. The vehicle power supply system of claim 1, wherein the controller is configured to control charging of the sub-battery, when not entering into the ISG, in the state that the main battery allows the entrance into the ISG and the sub-battery is able to assist the ISG.

5. The vehicle power supply system of claim 4, wherein the controller is configured to set a target current of the sub-battery, according to a status of the sub-battery when not entering the ISG.

6. The vehicle power supply system of claim 5, wherein the controller is configured to regulate the target current, based on a charge voltage of the sub-battery.

7. The vehicle power supply system of claim 1, wherein the main battery is a lead-acid battery.

8. The vehicle power supply system of claim 1, wherein the sub-battery is mounted at an interior of the vehicle, and is a lithium-ion battery.

9. The vehicle power supply system of claim 1, wherein the controller is configured to determine whether the main battery allows the entrance into the ISG, according to at least one of a failure status of the main battery or an SoC value of the main battery.

10. A method for operating a vehicle power supply system, the method comprising:
    determining, by a controller of the vehicle power supply system, whether a main battery of the vehicle power supply system allows entrance into Idle Stop and Go (ISG) of a vehicle;
    determining, by the controller, whether a sub-battery of the vehicle power supply system is able to assist the ISG, when the controller concludes that the main battery allows the entrance into the ISG;
    determining, by the controller, whether to enter into the ISG when the controller concludes that the sub-battery is able to assist the ISG; and
    controlling, by the controller, the sub-battery to assist the main battery to supply power to an electronic load of the vehicle power supply system, when entering into the ISG,
    wherein the controlling the sub-battery to assist the main battery to supply of the power to the electronic load includes:
    setting a target voltage of the vehicle power supply system when entering into the ISG, to be equal to a voltage of the sub-battery when entering into the ISG.

11. The method of claim 10, wherein the determining of whether the sub-battery is able to assist the ISG includes:
    determining whether the sub-battery is normally operated;
    determining whether state of charge (SoC) of the sub-battery exceeds a predetermined reference SoC; and
    determining whether a cell temperature of the sub-battery is within a reference range.

12. The method of claim 11, wherein the determining of whether the sub-battery is able to assist the ISG includes:
    determining that the sub-battery is able to assist the ISG, when the sub-battery is normally operated, when the SoC value of the sub-battery exceeds the predetermined reference SoC, and when the cell temperature of the sub-battery is within the reference range.

13. The method of claim 10, wherein the controlling supplying of the power to the electronic load includes:
    determining whether a discharge current of the sub-battery is less than a preset discharge current upper limit;
    determining whether the target voltage is equal to or less than a first reference voltage, when the discharge current is less than the preset discharge current upper limit;
    maintaining the target voltage, when the target voltage is equal to or less than the first reference voltage; and decreasing the target voltage, when the target voltage is not equal to or less than the first reference voltage.

14. The method of claim 13, wherein the controlling supplying of the power to the electronic load includes:
determining whether the target voltage exceeds a second reference voltage, when the discharge current of the sub-battery is not less than the preset discharge current upper limit;
maintaining the target voltage, when the target voltage exceeds the second reference voltage; and
increasing the target voltage, when the target voltage fails to exceed the second reference voltage.

15. The method of claim 10, further including:
setting, by the controller, a target current of the sub-battery, according to a status of the sub-battery, when not entering into the ISG, in a status that the sub-battery is able to assist the ISG;
determining, by the controller, whether a charge voltage of the sub-battery exceeds a third reference voltage; and
deceasing, by the controller, the charge voltage, when the controller concludes that the charge voltage exceeds the third reference voltage.

16. The method of claim 15, further including:
determining, by the controller, whether the target current exceeds a preset charge current upper limit, when the charge voltage fails to exceed the third reference voltage;
maintaining, by the controller, the target current when the target current exceeds the preset charge current upper limit; and
increasing, by the controller, the target current, when the target current fails to exceed the preset charge current upper limit.

17. The method of claim 10, wherein the determining of whether the main battery allows entrance into ISG includes:
determining whether the main battery allows the entrance into the ISG, according to at least one of a failure status of the main battery or an SoC value of the main battery.

18. The method of claim 10, further including:
supplying, by the controller, the power to the electronic load by use of the main battery, when entering into the ISG, in a status that the sub-battery is not able to assist the ISG.

* * * * *